Figure 1:
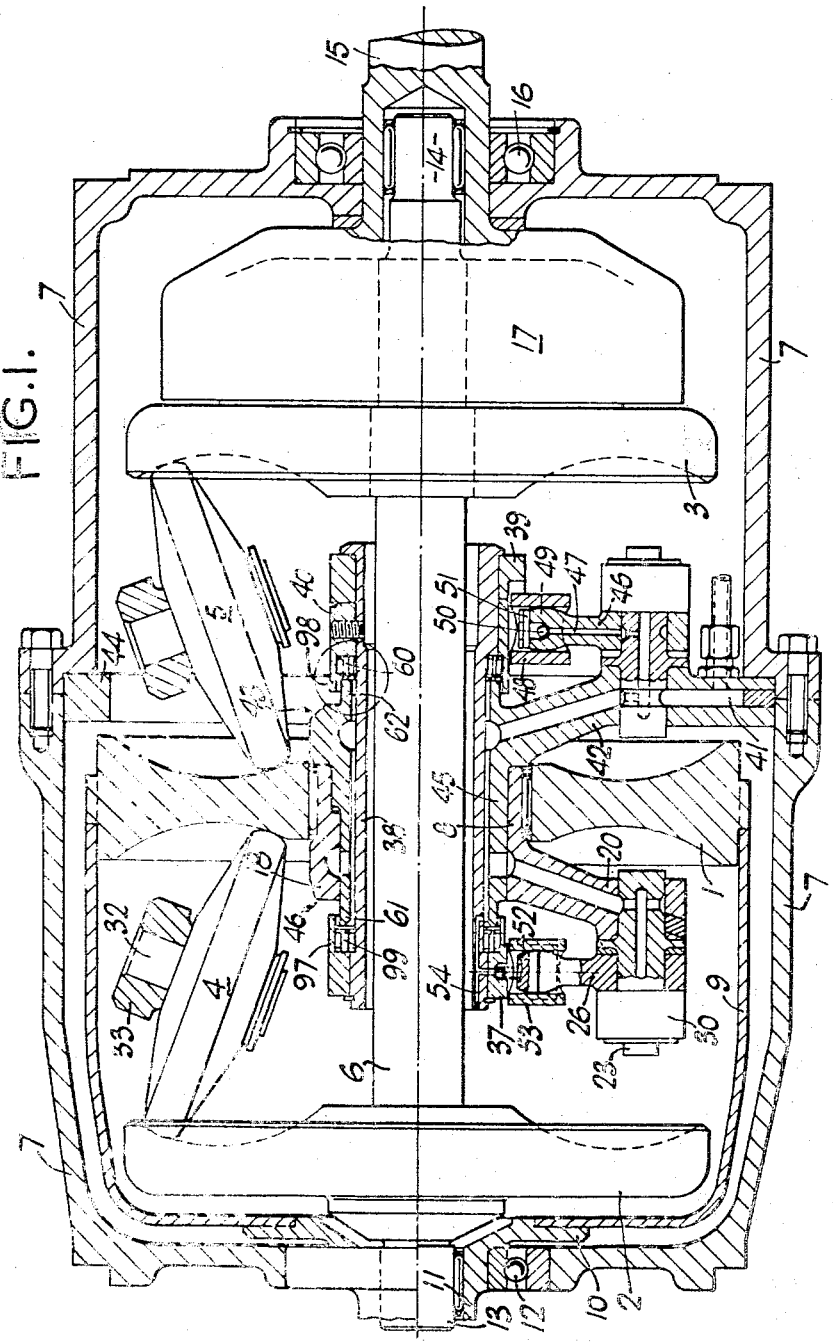

United States Patent Office 3,306,119
Patented Feb. 28, 1967

3,306,119
CONTINUOUSLY VARIABLE RATIO
TRANSMISSION UNITS
Forbes George de Brie Perry, East Grinstead, Michael Alexander Plint, Wargrave, Thomas George Fellows, London, and John Noel Armstrong, Caterham, England, assignors to National Research Development Corporation, London, England, a British corporation
Filed Dec. 14, 1964, Ser. No. 418,209
Claims priority, application Great Britain, Jan. 1, 1964, 7/64
18 Claims. (Cl. 74—200)

This invention relates to variable ratio transmission units of the so-called "rolling friction" type having coaxial input and output discs with facing toroidal surfaces between which tiltable rollers provide a driving connection.

The invention has particular relevance to transmission units of the said type in which the rollers are mounted with freedom of movement of a first character permitting the diameters of the disc with which the rollers make driving contact to be varied so as to vary the transmission ratio of the transmission unit and with freedom of motion also of a second character whereby the rotational axes of the rollers depart from the stable equilibrium attitude where the said roller axes intersect the common rotational axis of the discs so that the rollers steer themselves from ratio attitude to another ratio attitude.

According to the present invention there is provided a variable ratio transmission unit having a plurality of tiltable rollers in rolling engagement with and drivably interconnecting facing toroidal surfaces of coaxial input and output discs respectively, the rollers being mounted with freedom of motion of a first character causing the diameters of the discs with which the rollers make driving contact to be varied so as to vary the transmission ratio of the transmission unit and with freedom of motion also, of a second character whereby rollers are induced to undergo motions of the first character, mounting means for the rollers comprising means for controlling in unison motions of the rollers of the second character to initiate a ratio change on the part of the transmission unit but permitting differential relative motion of the second character as between one roller and another for load equalisation between the rollers characterised by fluid-filled dash pot damping means for damping only the said differential relative motions.

It is known for the roller mounting to be arranged so that the driving torque reactions of the rollers are at least partly applied to spaced-apart thrust receiving points on a common thrust receiving member which, by means of motion in a first mode causes the rollers, in unison, to undergo motions of the second character, but is additionally capable of motion in a second mode which causes the rollers to undergo motions of the said second character which are unequal in degree and/or opposite in sense in response to inequalities in the thrusts arising at the rollers and applied to the said thrust receiving points, whereby the rollers may change ratio individually but in a differential manner, in directions tending to equalise these thrusts and thus to ensure that the driving loads passing through the transmission unit are shared equally between the rollers.

With this arrangement the support and positioning of the common thrust receiving member, so far as movement in the said second mode is concerned, is dependent upon a balance of thrusts applied to the thrust receiving points and when substantial torque is being transmitted through the transmission unit the positioning of the common thrust receiving member is effective and stable.

When the transmission unit is rotated under no-load or light load conditions, however, the thrusts applied to the thrust receiving points are negligible and the common thrust receiving member is free to execute uncontrolled motions in the second mode. This results in a succession of ratio changes by the individual rollers which may lead to oscillations sufficiently violent to wreck the transmission unit or to drive the rollers into extreme ratio positions of different sense which causes the transmission unit to lock up.

It has been proposed to overcome this difficulty by the application of friction damping to the common thrust receiving member but this is not entirely satisfactory since this form of damping will resist movement until a substantial imbalance of torque reaction forces has built up and, on this imbalance reaching a certain threshold value, the damping means will suddenly yield and there will be a transition from relatively high static friction to relatively low sliding friction. This can enhance the oscillations of the common thrust receiving member, in the second mode, and any increase in the degree of frictional damping involves a sacrifice in the perfection of the inter-roller load equalisation obtainable under normal running conditions.

Embodiments of the present invention are described hereafter in which there is provided fluid-filled dashpot means adapted, on movement of the common thrust receiving member in the second mode, to displace fluid from a fluid-filled chamber through a passage offering resistance to the flow of fluid.

Conveniently a plurality of dashpots is provided each causing displacement of fluid through a resistive passage for one direction of movement in the second mode of the common thrust receiving member and together arranged in complementary fashion to regulate the motions of the common thrust receiving member in all directions in the second mode.

In order that the dashpots shall be constantly primed with fluid it is preferable to provide for a continuous flow of fluid from a source of fluid under pressure, into the dashpot chamber and out through the resistive passage and conveniently each dashpot may be single-acting as indicated in the preceding paragraph, a non-return valve being inserted in the path by which fluid enters the dashpot chamber from the pressurised fluid source to cut off backward flow from the chamber to the source when fluid is displaced from the chamber on movement of the common thrust receiving member in one direction, the valve opening to enable the chamber to be quickly replenished when the common thrust receiving member moves in the other direction. It may be sufficient to provide only one such dashpot means since an oscillation can be damped sufficiently by resisting one half cycle to satisfy certain requirements. It is nevertheless preferable to provide at least two dashpots arranged in complementary fashion and in the case where more than two rollers provide a driving connection between two facing toroidal surfaces on two coaxial discs respectively, it is preferred to provide one dashpot for each roller.

The description down to this point has related to a single roller or set of rollers providing a driving connection between two facing toroidal surfaces on two coaxial discs respectively. It is well known to provide two sets of rollers each set providing a driving connection between a pair of facing toroidal surfaces on coaxial discs each surface of one pair being coupled to rotate with a surface of the other pair so that the two pairs of surfaces and the sets of rollers respectively engaging them are operationally in parallel for the transmission of torque through the transmission unit. Such a transmission unit is hereinafter called a "parallel double-ended transmission unit."

It is important that the two sets of rollers in a parallel double-ended transmission unit should share the driving loads equally between them, and it is known to couple together two common thrust receiving members, one associated with each set of rollers and to arrange that the assembly of coupled common thrust receiving members is capable of motion in a third mode which initiates differential ratio changes as between the two sets of rollers, in response to any inequality between the thrusts applied by the two sets of rollers to their respective common thrust receiving members coupled together as aforesaid, whereby the more highly loaded set of rollers assumes a lower ratio and the less highly loaded set of rollers assumes a higher ratio until the loads are equalised as between the two sets of rollers.

This motion of the coupled assembly of common thrust receiving members is also liable to break into oscillation when the transmission unit is unloaded or lightly loaded and embodiments of the invention are described hereafter in which there is provided fluid-filled dashpot means adapted, on movement of an assembly of coupled common thrust receiving members in a parallel double ended transmission unit in the third mode, to displace fluid from a fluid-filled chamber through a passage offering resistance to the flow of fluid. Conveniently, again, a plurality of dashpots is provided, each causing displacement of fluid through a resistive passage for movement in one sense in the third mode, of the coupled assembly of common thrust receiving members and together arranged in complementary fashion to regulate motions of the coupled assembly of common thrust receiving members in both senses in the third mode.

To reduce to a minimum the complexity of the dashpot means it may be arranged that each dashpot can perform the dual function of damping a motion, either in the second mode or in the third mode, of coupled assembly of common thrust receiving members.

Figure 2:
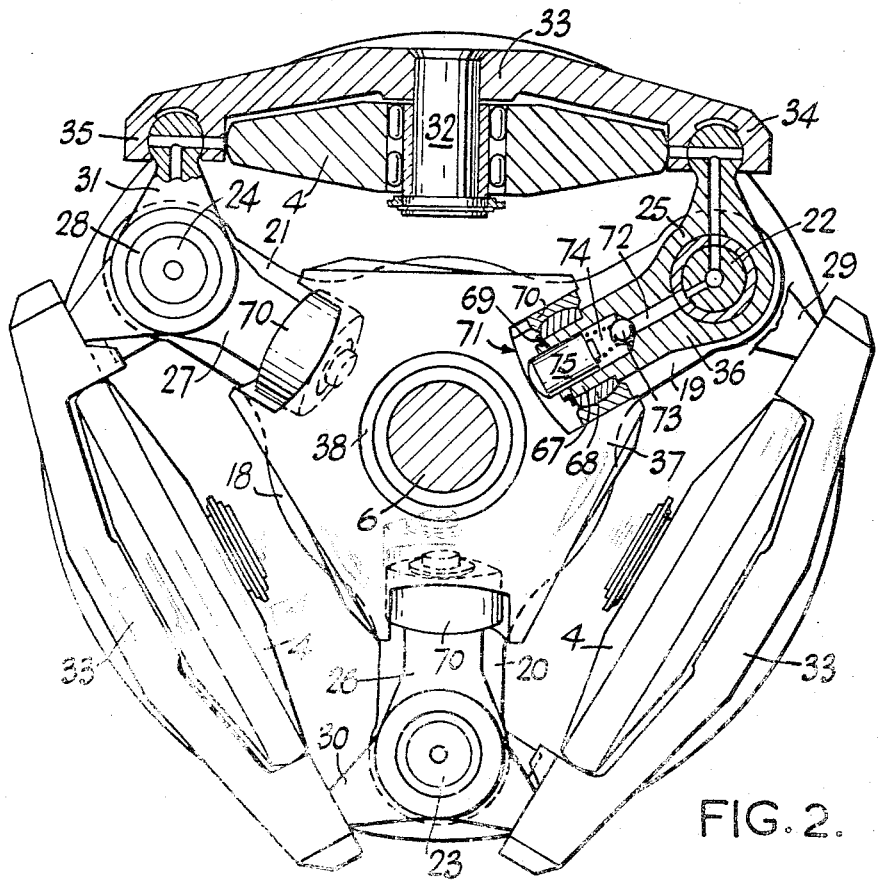
Figures 2A, 2B:
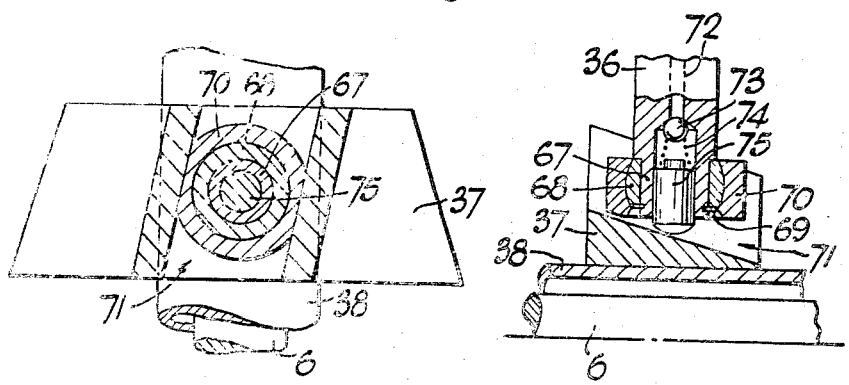
Figure 3:
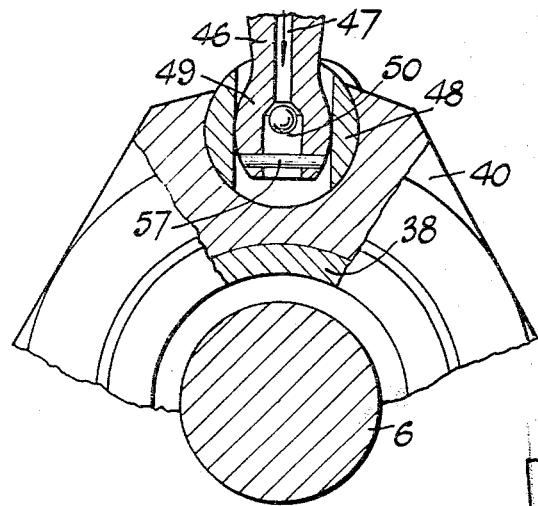
Figure 4:
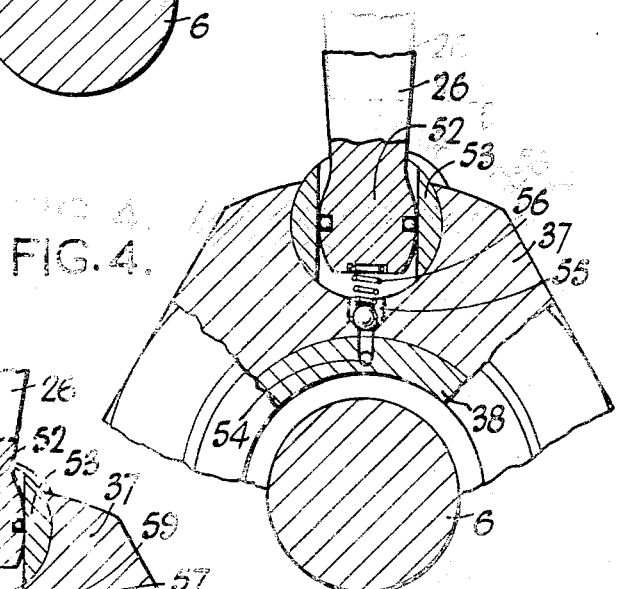
Figure 5:
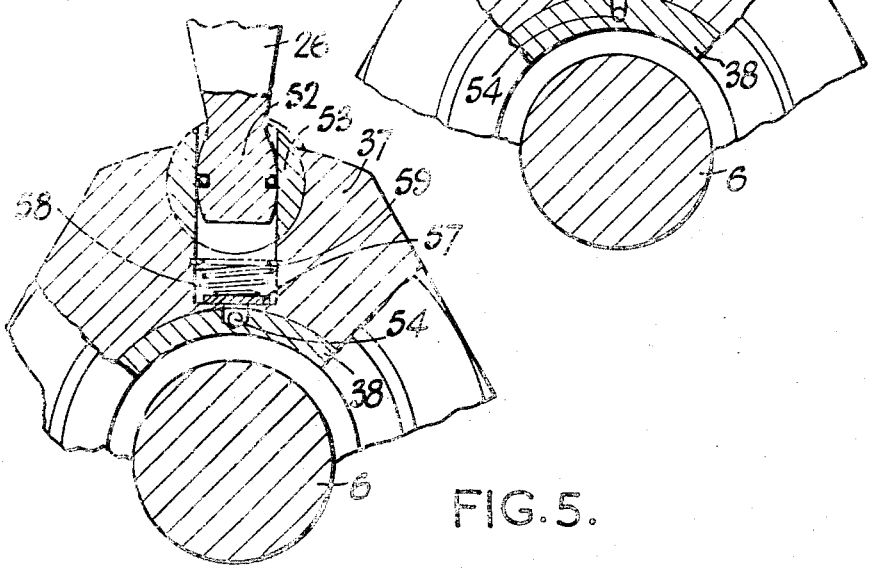
Figure 6:
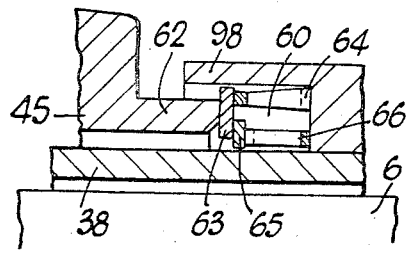
Figure 8:
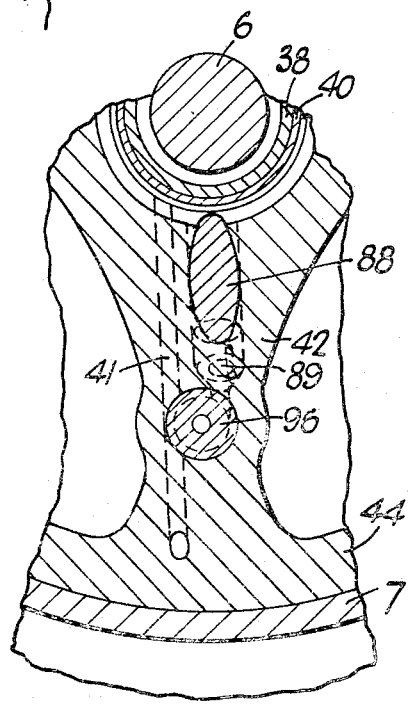
Figure 9:
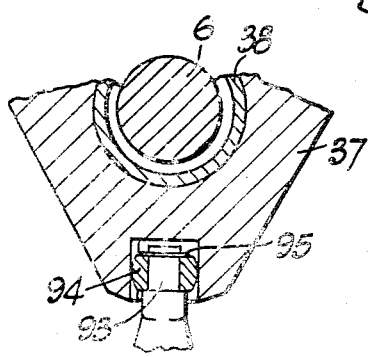
Figure 7:
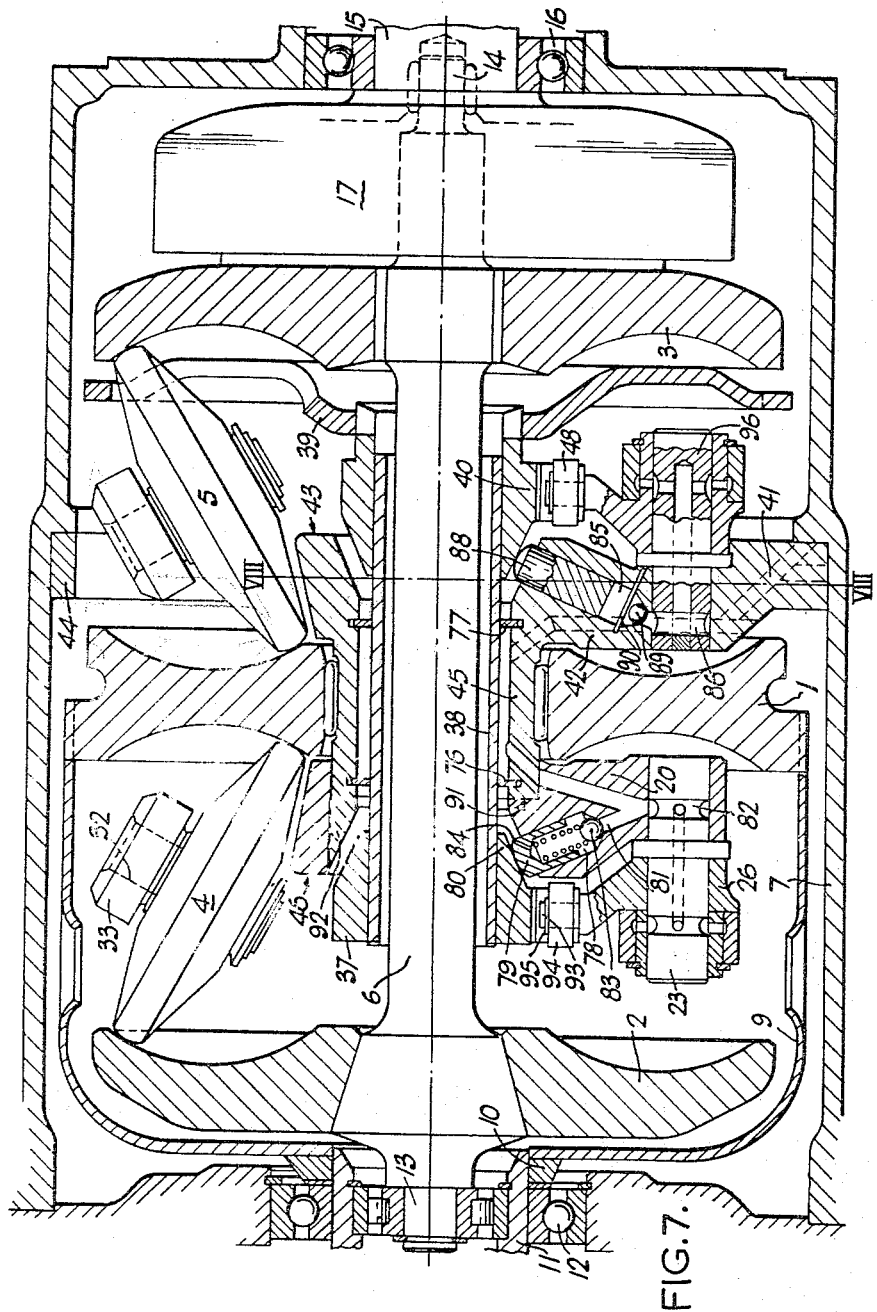

The invention will be more readily understood from the following description of certain embodiments thereof, illustrated in the accompanying drawings in which:

FIGURE 1 is a longitudinal section of a transmission unit embodying the invention alternative forms of which are illustrated in the one drawing, FIGURE 2 is a cross-section of a transmission unit embodying certain features of the invention, FIGURE 2A is a section of parts of the embodiments illustrated in FIGURE 2, FIGURE 2B is a section in another plane of the parts shown in FIGURE 2A, FIGURE 3 is a section of parts of the embodiments illustrated in FIGURE 1, FIGURE 4 is a section of other parts of the embodiments illustrated in FIGURE 1, FIGURE 5 is an alternative form of the parts illustrated in FIGURE 4, FIGURE 6 is a section of other parts of the embodiments illustrated in FIGURE 1, FIGURE 7 is a longitudinal section of a transmission unit embodying the invention in certain other alternative forms which are illustrated in the one drawing, FIGURE 8 is a cross section of parts of one of the embodiments illustrated in FIGURE 7, FIGURE 9 is a cross section of other parts of the embodiments illustrated in FIGURE 7.

In FIGURE 1 a transmission unit according to one embodiment of the invention is shown partly sectioned in a plane containing the axis common to the discs and the input and output shafts (hereinafter called the "main axis") but certain parts are not sectioned so that the drawing shall not be burdened with detail which is not material to the invention.

This is a parallel double-ended transmission unit having a centre disc 1, with toroidal surfaces on both of its faces, each of these surfaces engaging a set of rollers which provide driving connections respectively to inwardly facing toroidal surfaces on two outer discs 2 and 3 respectively. Only one roller of each set is shown but there are in fact three rollers in each set. Roller 4 of one set is seen to make contact with disc 1 and disc 2 and roller 5 of the other set is seen to make contact with disc 1 and disc 3.

Discs 2 and 3 are keyed to and rotate with a centre shaft 6, indirectly supported in bearings in the end walls of the transmission unit casing 7.

Disc 1 rotates on needle roller bearings the inner race of which is provided by the outer surface of a sleeve 8 which forms part of a rigid roller-supporting spider assembly anchored to the casing 7. The assembly will be described later.

Disc 1 has castellations on its outer edge which engage notches on the open rim of an input bell member 9. Bell member 9, which encloses disc 2 and the left hand set of rollers exemplified by roller 4, has a closed end which is secured to a flange 10 forming part of input shaft 11. Input shaft 11 is supported by ball bearing 12 in casing 7, and is hollowed out to provide the outer race of a needle roller bearing which supports the left hand spigot-end 13 of shaft 6. The other end of shaft 6 has a similar spigot 14 (shown in dotted lines) and this spigot rotates in needle bearings in a hollow internal bore in an output shaft 15, which in turn is supported by a ball bearing 16, in casing 7.

A hollow drum 17, secured to output shaft 15 encloses a cam device which exerts a force to the right on shaft 6 and a force to the left on disc 3 proportional to the output torque. Disc 2 is secured against axial movement along shaft 6 but disc 3 is capable of limited axial sliding along 6, so that, in dependence on the output torque, discs 2 and 3 are forced together, with the two sets of rollers and disc 1 between them to ensure driving engagement between the rollers and the toroidal surfaces of the discs. Cam devices of this type are well known in the art and it is not necessary to describe the one contained within drum 17, which may indeed take any one of a number of known forms.

The roller support assembly can best be described with reference to FIGURE 2 which is a transverse section of the transmission unit of FIGURE 1 looking from the left, with disc 2 and bell member 9 removed to reveal what lies behind them.

A central tubular boss 18 is integral with sleeve 8 which itself fits over a sleeve 45 forming part of tthe right hand component of the said rigid spider assembly. Boss 18 is integral with three radially divergent spider arms 19, 20 and 21. These spider arms have at their outer ends, spider pins 22, 23, 24 extending parallel to the main axis and in the direction of disc 2. These pins provide fulcrum pivots for three bell crank rockers 25, 26 and 27 respectively. Each rocker has a central boss fitting over its spider pin and these bosses have tubular extensions (such as 28 of rocker 27) which provide bearings for three idler links 29, 30 and 31 respectively.

The rollers are all similarly mounted and these mountings will be described in relation to roller 4. Roller 4 is supported by roller bearing for rotation about an axle pin 32 secured to and extending inwardly from the centre of a roller carrier 33 which extends across the outer surface of roller 4 and is further extended at each end to embrace the tread of the roller and provide part-spherical sockets 34 and 35. Socket 34 receives a spherical end of rocker 25 and socket 35 receives a spherical end of idler link 31 which is free to rotate upon tubular extension 28 of rocker 27 independently of any rotation of rocker 27 about spider pin 24.

The inwardly extending leg 36 of rocker 25 engages (by means of components to be described later), a slot in a common thrust receiving member 37.

Let it be assumed that the disc 1 normally rotates clock-wise in relation to FIGURE 2. When the input shaft is transmitting torque through the transmission unit to the output shaft, the torque reaction against the roller supports will also act in clockwise sense, and in the case of roller 4, this will be from left to right in FIGURE 2.

The three rollers of the set will therefore tend to turn common thrust receiving member 37 in an anti-clockwise direction but a control linkage (not shown) will resist, or control, this tendency.

A roller is in equilibrium at a certain ratio when its rotational axis intersects the main axis and if the roller is tilted so that this is not so it will steer a spiral course across the faces of the discs such as to change its ratio angle; for instance if the axis of roller 4 is displaced to the right (as seen in FIGURE 2) the roller will steer towards a lower ratio of output speed:input speed. Ratio changes are initiated by rotating common thrust receiving member 37 about the main axis, through the said control linkage, by control member external to the rotating assembly of the transmission unit and this control member may be part of a servo loop adapted to arrest the ratio change in response to a fed back signal dependent on desired performance criteria for the installation served by the transmission unit (e.g. output speed, input speed, or the ratio between these, and/or input torque). A roller displaced from its equilibrium attitude will continue to change ratio indefinitely if its ratio axis (e.g., in the case of roller 4, the line intersecting the centres of spherical sockets 34 and 35 and the roller centre) lies in the plane of the circle forming the locus of the centre of the circle which is the generator of the facing toroidal surfaces of discs 1 and 2 (hereinafter called the "torus centre circle") and with this geometry (hereinafter called "neutral camber angle" geometry), reliance is placed on the control servo loop to restore the roller to its original equilibrium position when the ratio has changed to the required extent.

In an alternative geometry the roller ratio axis is canted out of the plane of the torus centre circle in the plane containing the roller running track, through a small angle called a "camber angle" so that, when the roller rotates about this displaced ratio axis its axis of rotation about axle pin 32 has a component of rotation in the plane of the torus centre circle whereby the roller will reach a ratio equilibrium at a certain ratio dependent on the position of its rocker. With camber angle geometry the demand member of the ratio control system need not of necessity be controlled by a servo loop, and may be moveable to different positions (by hand, for instance) each of which will produce a definite ratio for the transmission unit.

Yet another alternative ratio control geometry, similar in operation to camber-angle geometry (and hereinafter called "tilt-cancelling" geometry), is one in which, though the roller ratio axes lie in the plane of the torus centre circle, the coupling between the roller and the member (such as a rocker) through which it is initially displaced from ratio equilibrium is such as to displace the roller in relation to the said member, when a ratio angle motion takes place, in a sense such as to bring the axis of the roller axle pin again into intersection with the main axis, though the said member retains the displacement which initiated the ratio change. One way of achieving this is to replace the ball and socket coupling between rocker and roller, as shown in FIGURE 2, with a screw and nut assembly coaxial with the ratio axis.

Whether neutral camber angle geometry, camber angle geometry or tilt cancelling geometry is adopted the means, now to be described, whereby the rollers are automatically adjusted to equalise their shares of the driving load, is substantially the same.

The common thrust receiving member 37, though restrained in respect of rotation about the main axis by the said control linkage, is free to move to a limited extent in any direction radial of the main axis and its location in such directions is determined by the balance of the torque reaction forces originating at the rollers and applied to it by the inwardly extending legs of the rockers, rockers 25, 26 and 27.

These torque reaction forces operate in directions normal to the centre lines of these inwardly extending arms of the rockers, that is to say tangential to the circle passing through the three thrust receiving points where the tips of the rocker arms make effective contact with the slots of the common thrust receiving member which receive them. If one roller is taking more than its fair share of the driving load it will convey a larger torque reaction force to the corresponding thrust receiving point than do the other rollers to their corresponding thrust receiving points and in the simple case where those other rollers are equally underloaded the common thrust receiving member will shift over bodily in a direction of the tangent, at the thrust receiving point associated with the overloaded roller, to the circle passing through the three thrust receiving points. The result of this shift-over of the common thrust receiving member is that the rockers of the underloaded rollers are turned in a sense such as to initiate ratio changes towards a higher ratio, on the part of the underloaded rollers. With camber angle and tilt cancelling geometry, this equalising shift-over of the common thrust receiving member will persist, other things being equal, but with neutral camber angle geometry the common thrust receiving member will move back towards some neutral position (which will be constant for any particular overall ratio of the transmission) as the rollers change ratio to equalise their shares of the driving load.

So long as a substantial torque is being transmitted through the transmission unit the balance between the quite substantial forces which determines the bodily radial location of the common thrust receiving member will generally hold it steady and inhibit oscillation but if the torque is negligible the common thrust receiving member is floating freely from the point of view of bodily motion radially of the main axis and its own weight and/or external disturbances will displace it to a position which will initiate ratio changes on the part of the rollers, independently of one another both in degree and direction. As soon as any two rollers assume different ratio angles they work against one another and generate torque reaction forces in opposite directions. These forces cause bodily radial shifts of the common thrust receiving member tending to equalise the ratios of the rollers but it can readily be appreciated that a vicious oscillation can build up and this occurs more readily the more sensitive the load equalisation performance of the roller equalisation.

With a relatively insensitive load equalisation system it has been found that frictional restraint of bodily movement of the common thrust receiving member will inhibit oscillation in many practical applications and U.K. patent specification No. 28,397/59 describes methods of applying such frictional restraint. This frictional restraint degrades the equalisation performance of the transmission unit, however, since the forces acting on the common thrust receiving member fall as the equalised condition is approached and a point is reached, short of accurate equalisation, where the forces are insufficient to overcome the friction of the restraining means.

It is now beginning to be realised that extremely small differences between the effective ratio angles of the rollers can set up recirculating (or so-called "built-in") torques of sufficient magnitude to usurp a high proportion of the theoretical maximum driving grip of the rollers upon the disc surfaces, for any given "normal" end-loading of the contacting surfaces of the rollers and the discs. To eliminate such differences of roller ratio angle without an automatic equalisation system involves an accuracy of manufacture which can only be tolerated for applications where the need for a steplessly variable ratio transmission is so imperative that cost can be disregarded. If the requisite accuracy is not maintained the transmission unit has to be down-rated to an extent which is only acceptable where bulk and weight are unimportant.

Where inexpensive manufacture, minimum size and weight, maximum efficiency, and low heat generation are demanded as in the case of a transmission unit for a road vehicle, it is considered that only the most accurate and sensitive automatic inter-roller load equalisation system is adequate and, as indicated previously, this enhances the tendency for the system to oscillate. An extensive analysis of the mechanism of this oscillation has led to the conclusion that it can best be inhibited by viscous fluid damping of the load equalisation motions of the common thrust receiving member but it is undesirable that other modes of motion of the common thrust receiving member should be restrained by the damping means. For instance, in the case of the embodiments of the invention herein described, the rotational motion of the common thrust receiving member about the main axis should not be affected by the damping. When substantial torques are being transmitted the torque reaction thrusts tending to rotate the common thrust receiving member and the control forces applied through the said linkage to resist them, are of substantial magnitude but in many applications for a transmission unit of this type a sensitive servo control system is required which will generate control forces instantly, in response to fluctuations in torque. If the reaction to a change of torque is delayed by damping means the response of the servo system to the change of torque will be similarly delayed and this will frequently upset the performance of the control system; particularly where the control force of the servo system is utilised to control some other function of the installation such as, for instance, a clutch.

The manner in which these requirements are met, in the said embodiments of the invention, will now be described, at first in relation to FIGURES 1, 3, 4 and 5.

The arrangement of FIGURE 1 lends itself either to neutral camber angle geometry or camber angle geometry. Ratio control of the rollers is achieved by rotating the common thrust receiving member 37 by means of a sleeve 38 which passes through the centre disc 1 and a lever 39 (only the central boss of which is shown). Adjacent to this lever is the common thrust receiving member 40 associated with the right hand set of rollers which interconnect discs 1 and 3. The linkage connecting lever 39 to the external ratio control member is of a well known type which applies rotational restraint to sleeve 38 but leaves it free to move radially and axially in relation to the main axis.

The damping associated with common thrust receiving member 40 will be described first.

An oil feed duct 41 is accommodated within one of the legs 42 of the spider sub-assembly 43 associated with the right hand set of rollers. This spider sub-assembly is anchored to the casing by means of a ring 44 which is integral with the outer ends of the three spider legs. Duct 41 is continued inwardly to the centre of spider sub-assembly 43 and leads to an annular space between sleeve 38 and a sleeve 45, which is an integral part of spider sub-assembly 43 and which fits within sleeve 8 to support the same and the other spider sub-assembly 46 associated with the left hand set of rollers. The annular space between sleeves 38 and 45 is closed at both ends by means to be explained later. From this space ducts lead outwardly through the centre of the other two legs of spider sub-assembly 43 and communicate with central bores in the spider pins supporting the rockers. These central bores lead through suitable oil ways to bores running through the inwardly extending limbs of the three rockers which will be described in relation to the lower rocker 46 since the three rockers are similar. In the case of rocker 46, this bore is denoted 47. The inner end of rocker 46 is in the form of a barrel 49 which fits within a transverse bore in a cylindrical guide member 48 which is accommodated within a cylindrical slot in the common thrust receiving member 40, this slot being slightly oblique in relation to the plane passing through its centre and containing the main axis. Bore 47 is widened within barrel 49 to provide a seating for a ball to form a check valve 50 which is so directed as to stop the return flow of oil back up the rocker limb 46 towards the spider pin.

The bottom of the transverse bore in guide member 48 is covered by the surface of the slot in the common thrust receiving member 40 but there is a slight leak at this point which acts as a resistive escape passage from the space between barrel 49 and the bore in guide member 48 which co-operates to form a single acting dashpot, continually kept full by flow through check valve 50 and the said leak except when common thrust receiving member 40 moves quickly towards rocker 46, in which event check valve 50 closes and the oil must escape through the said leak, whereby motion of common thrust receiving member 40 in the direction in question is damped. There is, additionally some leakage between barrel 49 and the bore of guide member 48 but this can be minimised if required by fitting a piston ring around the equator of barrel 49.

Similar arrangements on the other two rockers ensure that motion of common thrust receiving member 40 in any direction radial of the main axis is damped but only high-velocity motion is affected so that load equalisation between the rollers, though possibly delayed slightly, is able to proceed to the same end-point which would have been reached with no damping of radial motions of the common thrust receiving member. Any tendency to oscillate is strongly damped however. The damping is at its maximum at the point in the oscillatory cycle when the velocity is at a maximum and falls away to zero when the common thrust receiving member comes to rest at the extremes of its oscillatory excursion and this is the most effective phase relationship for inhibiting oscillation. There is thus no "stick-slip" effect to aggravate the oscillation as would exist with frictional damping.

A keeper pin 51 retains the ball of check valve 50 from escaping too far from its seating.

FIGURE 3 shows the dashpot of rocker 46 in cross section to a larger scale.

The left hand set of rollers is shown in FIGURE 1 with an alternative design of dashpot and in this respect FIGURE 1 is a composite figure. It is not suggested that different forms of dashpot would be used in one and the same transmission unit.

Rocker 26, which is typical of the three rockers of the left hand side of the transmission unit will be described. In this case the inwardly extending rocker limb ends in a barrel 52 which rides in a transverse bore in a guide member 53 which in turn is accommodated in a cylindrical slot in common thrust receiving member 37, and to that extent the assembly is similar to the assembly previously described in relation to rocker 46.

Rocker limb 36 does not however have a central bore. Oil from the space between sleeves 38 and 45 passes along a passage 54 drilled parallel to the main axis through the thickness of sleeve 38 via a radial hole drilled to meet passage 54 from the said inter-sleeve space. From passage 54 the oil flows radially outwards through a hole leading to the cylindrical slot in common thrust receiving member 37, in which guide member 53 is housed. The end of this hole is widened out at a position opposite to the end of the transverse bore of guide member 53 to form a seating for a ball which seating and ball together form a check valve 55, the ball being forced towards its seating by a weak spring 56 nested in a depression in the end face of barrel 52. The dashpot action is substantially the same as previously described in relation to the dashpot associated with rocker arm 46. The arrangement is shown in transverse section in FIGURE 4, and FIGURE 5 shows a minor variant in which the check valve 55 comprises a small disc 57, urged to its seating by a spring 58, the other end of the spring being located by a clip ring 59.

The dashpot damping devices described so far could be applied equally to a single ended transmission unit with one set of rollers interconnecting two discs, as to a double-ended transmission unit. With a parallel double-ended transmission unit it is necessary to provide means for automatically equalising the charges of the driving load carried by the two sets of rollers.

In the embodiments of the invention illustrated in the accompanying drawing this load equalisation between the two sets of rollers is achieved by the known method of cutting the slots in the common thrust receiving members, engaged by the rocker limbs, obliquely in relation to the main axis, the slots of one common thrust receiving member being oppositely slanted in relation to the slots of the other common thrust receiving member so that movement of the coupled assembly of common thrust receiving members axially of the main axis moves all the rockers associated with one set of rollers in a direction such as to initiate a ratio change in one sense for that set of rollers and moves all the rockers associated with the other set of rollers in a direction such as to initiate a ratio change in the opposite sense for that other set of rollers. The slant angles of the rocker-engaging slots of the two common thrust receiving members must be such that the thrusts arising at the inner ends of the rocker limbs due to the torque reactions arising at the rollers, have substantial components tending to move the common thrust receiving member axially of the main axis. These axial components applied to the two common thrust receiving members are oppositely directed and the common thrust receiving member assembly tends to move to a position at which the torque reactions of the two sets of rollers are equal. Again, as in the case of load equalisation between the rollers of a set, the axial load equalisation action of the coupled common thrust receiving member assembly may oscillate when the loads are light or absent.

In FIGURE 1 separate measures are taken to damp these axial motions of the coupled common thrust receiving member assembly. The two common thrust receiving members 37 and 40, have inwardly extending tubular extensions, 97 and 98 respectively and each of these extensions is of larger internal diameter than the external diameter of sleeve 38 so as to define annular chambers 99 and 60. The adjacent parts of the two spider assemblies have tubular extensions 61 and 62 which penetrate within the respective chambers 99 and 60 with radial clearance on both sides. These chambers 99 and 60 form dashpots or fluid dampers and as they are mirror images of one another the detailed description which follows is confined to the latter which is shown to an enlarged scale in the insert FIGURE 6.

Within chamber 60 there is an annular washer 63 the outer margin of which fits, with a small clearance, within the inner diameter of extension 98 and the inner margin of which fits, with a relatively larger clearance, over the outer surface of sleeve 38. A relatively strong annular spring 64, located between the annular end of chamber 60 and the washer 63, forces the latter into sealing contact with the end face of tubular extension 62. Another annular washer 65 has an internal diameter such as to be a sliding fit over sleeve 38 and an external diameter such that it overlaps the inner edge of washer 63. Another annular spring 66, substantially lighter than spring 64, urges annular washer 65 into face-to-face contact with the overlapped portion of annular washer 63. Springs 64 and 66 may be waved springs and may be of rectangular or circular cross section. The rates of spring 64 and its companion spring in the other chamber 59 must be such that they do not significantly restrict axial motions of the coupled common thrust receiving member assembly or bias it to any particular axial position.

The space between sleeves 38 and 45 is supplied with oil under relatively low pressure (e.g. 20 lbs. per sq. in.) via duct 41, as previously indicated. This pressure will normally compress spring 66 so as to open up a gap between washers 62 and 65, through which oil will flow into chamber 60, the clearance around the outer margin of washer 63 forming a resistive escape passage from chamber 60. There will therefore normally be a constant small flow of oil into and out of chamber 60, which ensures that it is always filled and scavenged of air. As the surface of washer 63 facing chamber 60 is larger than the surface presented to the gap between sleeves 38 and 45, the pressures being substantially the same, washer 63 is normally held, hydrostatically, in contact with the end face of tubular extension 62.

In the event of axial oscillation of the coupled common thrust receiving member assembly, one direction of motion will force washer 63 further into chamber 60 and the resulting rise of oil pressure therein will force washer 65 against washer 63 to close the entry passage to chamber 60 in the manner of a check valve. Oil will be forced past the clearance around the outer margin of washer 63 and the motion will be damped. Axial motion in the other direction of the coupled common thrust receiving member assembly will withdraw tubular extension 62 from chamber 60 and there would be a tendency for its end face to lose contact with washer 63 were it not for spring 64 which, by virtue of its greater strength than spring 66 permits washers 65 and 63 to separate and re-open the oil inlet passage to chamber 60, whereupon hydrostatic conditions again obtain such as to hold washer 63 in contact with tubular extension 62.

Chambers 99 and 60 operate in "push-pull" to damp axial motions of the coupled common thrust receiving member assembly in either direction.

FIGURE 2, which has been represented hitherto as being a transverse section of the transmission unit of FIGURE 1 for the purpose of illustrating the roller supporting structure, differs therefrom in respect of the damping means and the parts associated with the interengagement of the rockers and the common thrust receiving member and in fact illustrates an arrangement where dampers of the dashpot type co-operate between the rockers and the thrust receiving points of the common thrust receiving member to damp both radial and axial oscillation of the common thrust receiving member.

The damper associated with rocker 36 will be described as typical of the three dampers which are alike. A somewhat more sophisticated guide member and thrust receiving point slot are used. The inwardly-extending limb of rocker 36 terminates in a cylindrical spigot 67 over which is fitted a sleeve 68 the outer surface of which forms part of a sphere and which is anchored to spigot 67 by a spring clip 69. Sleeve 68 fits within an outer socket 70 in the inner surface of which is part-spherical to fit the part-spherical surface of sleeve 68 and the outer surface is that of a cylinder with two diametrically opposite "flats" adapted to engage the side walls of a parallel-sided slot 71 in common thrust receiving member 37.

Rocker limb 36 is supplied with oil through a central bore 72 in the same way as rocker 46 of FIGURE 1. This central bore terminates in ball check valve 73 similar to check valve 50 of FIGURE 1. The inner end of rocker limb 36 is however bored out to a larger diameter for a distance from the inner tip sufficient to form a dashpot cylinder 74 which receives a plunger 75.

The rounded inner tip of plunger 75 engages the base of slot 71 and when common thrust receiving member 37 moves radially towards rocker limb 36 plunger 75 is driven upwards into cylinder 74 closing ball check valve 73 and causing oil to be forced down the clearance between plunger 75 and cylinder 74. A light spring seated at one end on the top of plunger 75 normally urges the ball of valve 73 upon its seating but the oil pressure in bore 72 is normally sufficient to overcome this spring and thus maintain a constant flow into the dashpot and out via the clearance around the plunger 75 whereby the dashpot is kept full of oil and scavenged of air. The co-operation of three similar dashpot devices associated with the three rockers ensures damping of the common thrust receiving member for any direction of radial motion.

The radii of the tip of plunger 75 and the base of slot 71 are chosen so that mere rotary motion of common thrust receiving member 37 does not cause plunger 75 to move up and down in bore 72.

Inset FIGURES 2A and 2B show sections, in different planes, of the dashpot device associated with rocker limb 36. FIGURE 2A is a section in a plane containing the centre of the spherical surface of sleeve 68 normal to the centre line of rocker limb 36 and parallel to the main axis and from this inset figure it can be seen that the side walls of slot 71 are oblique to the main axis so that load equalisation between the two sets of rollers can be obtained by axial movement of the coupled common thrust receiving member assembly. Inset FIGURE 2B is a section in a plane containing the main axis and the axis or rocker limb 36 and it will be seen that the floor of slot 71 is inclined from a larger diameter at the end remote from centre disc 1 to a smaller diameter at the end nearest to centre disc 1. Movement of the common thrust receiving member to the right forces plunger 75 upwards into cylinder 74 and this motion is damped, motion in the other direction is damped by similar means acting on common thrust receiving member 40 at the right hand end of the transmission unit. Thus any oscillatory motion, either radial or axial, of the coupled common thrust receiving member assembly is damped by the six dashpot devices associated with six thrust receiving points and the dashpots associated with chambers 99 and 60, previously described in relation to FIGURE 1 may be replaced by simple sealing means to close off the ends of the space between sleeves 38 and 45 so that space can act as an oil transfer passage.

Yet another method of combining the functions of radial and axial damping of a coupled common thrust receiving member assembly is illustrated in FIGURES 7, 8 and 9 in which items corresponding to items in FIGURE 1 are given the same reference numerals.

FIGURE 7, as in the case of FIGURE 1, shows different damping arrangements as between the two sides of the transmission unit and is in this respect a composite figure as is FIGURE 1.

In FIGURE 7 oil is supplied through duct 41 passing radially inwards through one of the spider arms of the right hand side of the transmission unit and enters the space between sleeves 38 and 45, in this case sealed at the ends by piston rings 76, 77 housed with considerable radial clearance in grooves in sleeve 45. From this space the oil passes outwardly to the spider pins of spider-sub-assembly 46, through oil passages drilled through the spider arms.

The spider arms of spider sub-assembly 46 are thickened at their inner ends to provide accommodation for plungers housed in bores in the spider boss, which bores are directed obliquely to the transverse plane containing the roller centres. The plunger assembly associated with spider arm 20 will be described as typical of the three plunger assemblies of the left hand side of the transmission unit which are alike.

The longitudinal axis of the bore 78 lies in a plane containing the main axis and the axis of spider pin and is inclined at an angle in that plane (e.g. about 70°) to the main axis.

The bore contains a plunger 79 the rounded protruding tip of which makes contact with a conical ring 80 which may be integral with or secured to common thrust receiving member 37. The radially outward end of bore 78 leads to an oilway 81 communicating with an oil transfer groove 82 cut around spider pin 23, and oil thus reaches bore 78 from the space between sleeves 38 and 45 via the oilway leading from that space through spider leg 20. At the transition between oilway 81 and bore 78 there is a ball check valve 83 (similar to check valve 50), the ball being urged towards its seating by a light spring partly housed in a cavity within plunger 79. Preferably this cavity is drained through a small leak hole 84 so that an air pocket does not form within it. Leak hole 84 and leakage past plunger 79 forms the resistive outlet passage from bore 78. To obtain the maximum possible damping efficiency for the dashpot 78/79 it may be desirable to make plunger 79 solid and provide alternative means (a cross pin for instance) to prevent the escape of the ball of valve 83, in place of the spring. The hole 84 would then be omitted, of course, and the escape passage from bore 78 could then be reduced in size to the maximum extent possible for any given manufacturing accuracy of the fit of plunger 79 in bore 78.

The right hand end of FIGURE 7, coupled with FIGURE 8 shows a damping arrangement enabling a longer plunger to be accommodated. This is achieved by slanting the centre line of the bore 85 of the dashpot, out of the plane containing the main axis and the centre line of the rocker pin but so that it lies in a plane still containing the main axis, but laterally displaced from the rocker pin centre line. The oilway between the rocker pin groove 86 and the space between sleeves 38 and 45 is offset to the other side of the rocker pin centre line so that this oilway lies tangential to and intersects groove 86 on one side and the short oilway feeding bore 85 is similarly placed in relation to groove 86 but on the other side of the rocker pin. Thus the full length of the spider leg 87, between the rocker pin and the central boss of the right hand spider sub-assembly is available to accommodate bore 85 and a plunger 88 housed within it. To simplify the drawing bore 85 and plunger 88 are sectioned as if they were in the same plane as the rocker pin. Correctly sectioned this drawing would either not adequately reveal the ball check valve 89 or not adequately reveal the orientation of the damper in relation to the oil feed thereto from the spider pin groove 86. The ball of check valve 89 is retained by a cross pin 90 which may be slightly offset from the centre of bore 85 and located axially further outwards from the main axis to minimise the encroachment upon the range of upward travel of plunger 88, which is solid. The true orientation of bore 85, plunger 88 and the various associated oilways is shown in transverse section (in the plane VIII—VIII of FIGURE 7), in FIGURE 8 which is self-explanatory.

The angle of the axes of the dampers to the main axis, and the angles of the co-operating conical surfaces, are not critical nor need the slope of the latter be normal to the damper axis. For instance if the damper axis was about 70° to the main axis, as shown, and the slant of co-operating surface was about 35°, the latter would be about 15° out of normal to the former and there would be some side thrust by the plunger against the side of its bore when the common thrust receiving member moved axially. For any given axial displacement of the common thrust receiving member the plunger would move axially of its bore by 60% of that displacement and for any given radial displacement of the common thrust receiving member the plunger would move axially of its bore by 85% of that displacement. If the conical surface of the common thrust receiving member was normal to the plunnger axis these percentages would be of the order of 30% and 95% respectively.

The choice of these angles is determined by the relative degrees to which the transmission unit is prone to axial oscillation or radial oscillation and as this depends on many complex factors it is best determined by trial and error at the prototype stage of design.

It must be borne in mind that an axial motion of the common thrust receiving member is resisted by three dampers (for each direction of such motion) so that a smaller proportion of this axial motion, transmitted to the plungers, will suffice, so long as that motion is not so small that the check valves are not operated.

The method of interlocking the two spider sub-assemblies in the region of the spider legs is seen in FIGURE 7 at the left hand end. The central boss of the left hand spider sub-assembly has an annular stepped recess generally indicated at 91 which fits socket-wise over the end of sleeve 45 (integral with the right hand spider sub-assembly). Between the spider legs of the left hand spider sub-assembly however the end wall of recess 91 is removed to provide axial spline channels and in these regions sleeve 45 is continued right through to the left hand margin of the spider sub-assembly in the form of dogs 92 which fit within the said spline channels. Relative rotation between the two spider sub-assemblies is thus prevented.

The manner of engagement of the rocker limbs and the common thrust receiving members takes another alternative form, in the embodiment of FIGURE 7, which can be more readily understood with the assistance of FIGURE 9.

The inner rocker tips, e.g. 93, are formed as spigots which pass through transverse holes in guide members, e.g. 94, which are each of cylindrical form with diametrically opposite "flats" normal to the transverse hole in which the rocker limb spigot ends fit. Each guide member is held in place on its spigot by a spring clip (e.g. 95) and is able to rotate about its spigot. The cylindrical sides of each guide member make contact with the sides of a parallel-sided slot in the common thrust receiving member. If the common thrust receiving member rotates, the cylindrical sides of the guide member partly roll and partly slide radially of the main axis, up and down the sides of the slot in the common thrust receiving member but the effective length of the rocker limb remains unchanged and any radial movement of the common thrust receiving member may be accommodated by bodily sliding of the guide member up and down the slot and/or by rotation of the guide member around its spigot.

This is a simplified treatment of the rocker thrust receiving point engagement problem as compared with that shown in FIGURE 2 in that relative rotations about the axis parallel to the main axis result in movement between cylindrical surfaces of the guide member on the one hand and flat surfaces on the common thrust receiving member slot on the other hand, which surfaces are in line contact, whereas in the FIGURE 2 arrangement the corresponding movement is between interfitting spherical surfaces forming part of the rocker tip assembly and the cam slot is engaged by flat surfaces of that assembly having substantial area. The principle that the reaction to torque reaction forces always acts along a line intersecting the rocker limb at a constant distance from its axis (i.e. the spider pin) is common to both arrangements however, and they are both superior to that shown in FIGURE 1 in so much as the barrel end of a rocker tip may, in certain radial attitudes of the common thrust reeciving member apply torque reaction forces to the bores in the cylindrical guide member at a point such that the line of action of the force does not intersect the centre line of the outer cylindrical surface of the guide member, whereupon the transverse bore of the latter will tend to cant in relation to the centre line of the rocker limb and the effective length of the rocker limb will change.

Since the roller-to-roller load equalising action of the common thrust receiving member is such that it equalises the forces applied to it by the rockers, if the rocker limbs are not at all times of equal length, the loads at the rollers will not all be equal when the common thrust receiving member has moved to an apparently equalised equilibrium position. This equalisation error will generally be small, but it can be significant when the best possible performance is demanded for the transmission unit.

We claim:

1. A variable ratio transmission unit having a plurality of tiltable rollers in rolling engagement with and drivably interconnecting facing toroidal surfaces of coaxial input and output discs respectively, the rollers being mounted with freedom of motion of a first character causing the diameters of the discs with which the rollers make driving contact to be varied so as to vary transmission ratio of the transmission unit and with freedom of motion also, of a second character whereby rollers are induced to undergo motions of the first character, mounting means for the rollers comprising means for controlling in unison motions of the rollers of the second character to initiate a ratio change on the part of the transmission unit but permitting differential relative motion of the second character as between one roller and another for load equalisation between the rollers charasterised by fluid-filled dash pot damping means for damping selectively only the said differential relative motions while leaving free from damping such unison motions on the part of the rollers which are simultaneously the same in sense and degree.

2. A variable ratio transmission unit having a plurality of tiltable rollers in rolling engagement with and drivably interconnecting facing toroidal surfaces of coaxial input and output discs respectively, the rollers being mounted with freedom of motion of a first character causing the diameters of the discs with which the rollers make driving contact to be varied so as to vary transmission ratio of the transmission unit and with freedom of motion also, of a second character whereby rollers are induced to undergo motions of the first character, mounting means for the rollers comprising means for controlling in unison motions of the rollers of the second character to initiate a ratio change on the part of the transmission unit but permitting differential relative motion of the second character as between one roller and another for load equalization between the rollers characterized by fluid-filled dash pot damping means for damping only the said differential relative motions, said controlling means comprising a common thrust receiving member and means for applying thereto the torque reaction thrusts to which the rollers are subjected, such member being capable of motion in a first mode resulting in motions of the rollers in unison of the second character and motion in a second mode resulting in motions of the rollers of the second character which are opposite in sense as between one roller and at least one other roller, said dash pot means being effective to damp motions in the second mode of the common thrust receiving member.

3. A transmission unit as claimed in claim 2 in which a motion of the common thrust receiving member in the first mode is a rotary motion and a motion in the second mode is linear motion and wherein the said dash pot means comprises a fluid-filled chamber coupled between the common thrust receiving member and a fixed part of the transmission unit and adapted to expel fluid from the chamber through a restriction in at least one direction of the said linear motion of the common thrust receiving member.

4. A transmission unit as claimed in claim 3 in which the mounting means for the rollers comprise a carrier for each roller, a lever pivoted on a fixed part of the transmission unit and coupling the roller carrier to a thrust receiving point individual to that roller carrier on the common thrust receiving member by means of a radially inwardly directed arm of the said lever and with dash pot damping means at the inner end of the said arm associated with at least one of the said rollers adapted to expel fluid from a chamber through a restriction when motion takes place on the part of the thrust receiving point, such motion having a component along the line joining that point and the pivot point of the lever.

5. A transmission unit as claimed in claim 4 in which the inwardly extending arms of the levers are received, at the respective spaced apart thrust receiving points on the common thrust receiving member, in guide members housed in slots in the said member the end of each arm entering and acting as a piston in a transverse hole in the associated guide member, which hole forms a cylinder, at least one resistive leakage path from the said cylinder and valve means through which fluid may enter the cylinder, such valve means being closed when the end of the associated arm reduces the volume of the cylinder on movement of the common thrust receiving member radially of the axis of the discs to displace fluid from the cylinder through the leakage path whereby such movement is damped, for one sense of motion, by the piston and cylinder assembly associated with each of the thrust receiving points.

6. A transmission unit as claimed in claim 4 in which the inwardly extending arms of the levers are received, at the respective spaced-apart thrust receiving points on the common thrust receiving member, in slots in the said member, plungers for each arm, each housed in an axial bore in the arm and having an end part extending beyond the arm and bearing on the base of the associated slot, a fluid supply passage leading to the bore of each arm from the pivot of the associated lever, check valve means between the said passage and the said bore permitting the flow of fluid into the bore but impeding the flow of fluid from the bore to the passage, and a resistive leakage path from the bore of each arm.

7. A transmission unit as claimed in claim 2 having two sets of rollers respectively providing driving connections operatively in parallel between facing toroidal surfaces on a first outer disc and one side of a central disc and a second outer disc rotationally coupled to the first outer disc and the other side of the central disc in which common thrust receiving members associated with the two sets of rollers are coupled together in an assembly capable of motion in a third mode permitting differential motion of the second character as between one set of rollers and the other set of rollers characterised by fluid-filled dash pot damping means for damping motions of the said assembly in the third mode.

8. A transmission unit as claimed in claim 7 in which the motions of the said assembly in the third mode are linear motions substantially parallel to the common rotational axis of the discs and in which the dash pot damping means comprises two elements one coupled to the said assembly and the other coupled to a fixed part of the transmission unit one of such elements taking the form of an annular cavity between two concentric cylindrical parts and the other of such elements taking the form of an annular piston adapted to enter into and recede from the said cavity on axial movement of the said assembly as aforesaid.

9. A transmission unit as claimed in claim 8 in which the said annular piston means comprises at least two washers spring urged against a fixed tubular member able to pass with radial clearance within the cavity, such washers forming a closure to the cavity when in contact with one another, a supply passage to the washers within the tubular member whereby the washers may be forced apart by fluid pressure against the spring to pass fluid into the cavity to replenish the same the washers being forced together to impede passage of fluid from the cavity when the motion of the said assembly of common thrust receiving members is in a direction such as to cause the piston means to advance into the cavity.

10. A transmission unit as claimed in claim 7 in which motions of the common thrust receiving members in the first mode are rotary motions about an axis parallel to the common rotational axis of the discs, in which motions of such members in the second mode are radial motions relative to the said common axis and in which motions of the assembly of common thrust receiving members in the third mode are axial motions in directions substantially parallel to the said common axis and in which radially opposed dash pot damping means damp radial motions of one common thrust receiving member and also axial movements as aforesaid of the assembly of common thrust receiving members.

11. A transmission unit as claimed in claim 10 having, for the dash pot damping means, at least one plunger housed in a bore in a part of the transmission unit substantially restrained from movement radially or axially in relation to the common rotational axis of the discs, the axis of the said bore and said plunger being substantially in a plane containing the said common axis and inclined to such common axis so as to have at least a component in the direction radial thereof, the said plunger extending beyond the said bore to make contact with a surface on the said common thrust receiving member assembly the line of intersection between the said surface and a plane including the said common axis and the said point of contact, being inclined to the said common axis.

12. A transmission unit as claimed in claim 11 in which the said intersection line and the axis of the said bore and plunger are mutually inclined by an angle not differing from 90° by more than 30°.

13. A transmission unit as claimed in claim 11 in which the mounting means for the rollers comprise a carrier for each roller, a lever pivoted on a fixed part of the transmission unit and coupling the roller carrier to a thrust receiving point, individual to that roller carrier, on a common thrust receiving member by means of a radially inwardly directed arm on the said lever, such arm being received at the thrust receiving point in a slot, the floor of this slot, along lines of intersection with planes containing the common rotational axis of the discs, being inclined to the said common axis, the said bore being formed in the said lever arm and the said plunger making contact with the floor of the slot, the inclination of the axis of the bore with respect to the floor of the slot being such that the plunger must move in and out of the bore both when the common thrust receiving member moves radially and when it moves axially of the said common axis of the discs, the floor of the slot being contoured in planes radial of the said common axis so that the common thrust receiving member can rotate without movement of the plunger in the bore.

14. A transmission unit as claimed in claim 13 in which the axis of the said bore is substantially radial of the said common axis of the discs.

15. A transmission unit as claimed in claim 11 in which the bores of the dash pot damping means are contained in a fixed part of the transmission unit and the surfaces with which the plungers of the dash pot damping means make contact form parts of a cone of which the axis is substantially coincident with the said common axis of the discs.

16. A transmission unit as claimed in claim 15 in which the axis of the bore of each dash pot damping means lies generally in a plane containing the said common axis of the discs but is inclined, in that plane, to the said common axis by an angle other than 90° and in which the line of intersection between that plane and the surface with which the associated plunger makes contact is inclined with respect to the axis of the said bore by an angle which does not differ from 90° by more than 30°.

17. A transmission unit as claimed in claim 2 in which the said dash pot damping means comprises at least one piston and cylinder assembly coupled to the common thrust receiving member so that the piston moves axially of the cylinder, on a movement of the said member which is to be damped, to change the volume of a chamber defined by the piston and the cylinder, a leakage path from the said chamber, a fluid supply passage leading to the said chamber and a check valve opening to permit flow of fluid into the chamber but closing to impede the expulsion of fluid through the valve on movement of the piston which reduces the volume of the chamber, whereby, when the piston is still, fluid flows from the passage into the chamber and escapes from the chamber via the leakage path, when the piston is moving to increase the volume of the chamber, fluid flows from the passage into the chamber to fill the increased volume and when the piston is moving to reduce the volume of the chamber the valve closes and fluid is expelled from the chamber through the leakage path.

18. A transmission unit as claimed in claim 17 in which the check valve comprises a ball spring urged towards a seating with means for limiting the distance which the ball may move from its seating in the open state of the valve.

References Cited by the Examiner

UNITED STATES PATENTS

| | | | |
|---|---|---|---|
| 2,014,922 | 9/1935 | Almen | 74—200 |
| 3,048,047 | 8/1962 | Richardson | 74—200 |
| 3,142,190 | 7/1964 | Kelsey et al. | 74—200 |
| 3,164,025 | 1/1965 | Francisco | 74—200 |

MARK NEWMAN, *Primary Examiner.*

DAVID J. WILLIAMOWSKY, *Examiner.*

L. H. GERIN, *Assistant Examiner.*